US011915617B2

(12) United States Patent
Sakurai

(10) Patent No.: US 11,915,617 B2
(45) Date of Patent: Feb. 27, 2024

(54) DISPLAY MEDIUM, PROCESSING DEVICE, AND PROCESSING PROGRAM

(71) Applicant: DWANGO Co., Ltd., Tokyo (JP)

(72) Inventor: Kaisei Sakurai, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 21 days.

(21) Appl. No.: 17/631,902

(22) PCT Filed: Jun. 22, 2020

(86) PCT No.: PCT/JP2020/024364

§ 371 (c)(1),
(2) Date: Feb. 1, 2022

(87) PCT Pub. No.: WO2021/033415

PCT Pub. Date: Feb. 25, 2021

(65) Prior Publication Data

US 2022/0293020 A1 Sep. 15, 2022

(30) Foreign Application Priority Data

Aug. 21, 2019 (JP) ................................ 2019-151127

(51) Int. Cl.
*G09F 19/14* (2006.01)

(52) U.S. Cl.
CPC .................................. *G09F 19/14* (2013.01)

(58) Field of Classification Search
CPC ...................................................... G09F 19/14
See application file for complete search history.

(56) References Cited

U.S. PATENT DOCUMENTS

| | | | | |
|---|---|---|---|---|
| 1,475,430 | A * | 11/1923 | Curwen | G09F 19/14 40/454 |
| 10,467,931 | B1 * | 11/2019 | Handelsman | G09F 21/048 |
| 2015/0082673 | A1 * | 3/2015 | Durant | G09F 19/14 40/446 |
| 2016/0320627 | A1 * | 11/2016 | Chen | G09F 19/14 |
| 2016/0371866 | A1 * | 12/2016 | Ng | H04N 13/398 |
| 2020/0168135 | A1 * | 5/2020 | Mehta | G09F 19/14 |

(Continued)

FOREIGN PATENT DOCUMENTS

| | | | |
|---|---|---|---|
| JP | 7-36400 | A | 2/1995 |
| JP | 2008-40265 | A | 2/2008 |
| JP | 2009-128771 | A | 6/2009 |

(Continued)

OTHER PUBLICATIONS

International Search Report dated Jul. 21, 2020 in corresponding application No. PCT/JP2020/024364; 5 pgs.

(Continued)

*Primary Examiner* — Gary C Hoge
(74) *Attorney, Agent, or Firm* — Maier & Maier, PLLC

(57) ABSTRACT

This display medium is formed of a sheet member that transmits light, is provided with a point group formed of one or more points, and includes a plurality of layers which at least partially overlap. The display medium displays a plurality of contents respectively corresponding to a first direction D1 and a second direction D2, on the basis of respective parts where each of light emitted in the first direction D1 and light emitted in the second direction D2 passes through each of the plurality of layers.

9 Claims, 11 Drawing Sheets

(56) References Cited

U.S. PATENT DOCUMENTS

2021/0165242 A1* 6/2021 Kusafuka ............. H04N 13/373

FOREIGN PATENT DOCUMENTS

WO 2006/049213 A1 5/2006
WO 2010/22433 A1 3/2010

OTHER PUBLICATIONS

Sylvain M. Chosson and Roger D. Hersch, "Beating Shapes Relying on Moiré Level Lines", ACM Transactions on Graphics, vol. 34, No. 1, Article 9, Publication date: Dec. 2014, 10 pgs.
Thomas Walger and Roger David Hersch, "Hiding Information in Multiple Level-line Moirés", DocEng '15 Proceedings of the 2015 ACM Symposium on Document Engineering, pp. 21-24, 4 pgs.
Roger David Hersch and Sylvain Chosson, "Band Moire Images", SIGGRAPH '04 ACM SIGGRAPH 2004 Papers, pp. 239-247, 10 pgs.
Japanese Office Action dated Oct. 8, 2019 in corresponding application No. 2019-151127, 9 pgs.
Office Action dated Nov. 18, 2023, in corresponding Chinese Application No. 202080054252.6, 12 pages.

* cited by examiner (a)

(b)

(a)

(b)

(c)

(a)

(b)

DISPLAY MEDIUM, PROCESSING DEVICE, AND PROCESSING PROGRAM

TECHNICAL FIELD

The present invention relates to a display medium, a processing device, and a processing program.

BACKGROUND

A display medium that displays different images depending on the direction is used for advertising posters, cards, etc. since the display medium attracts the attention of an observer and is easily noticed. In general, special apparatus and equipment are required to produce such a display medium.

For example, there is a display method in which a display apparatus displays pixel rows for left-side display and pixel rows for right-side display side by side in a right-left direction, and the display apparatus is provided with a parallax barrier where a light-shielding member for blocking light is vertically arranged (see Patent Document 1). In Patent Document 1, content including the pixel rows for left-side display can be observed from the left side, and content including the pixel rows for right-side display can be observed from the right side.

There is a display medium that displays different shapes by changing an angle at which two sheets printed with a multi-line pattern are overlapped (see Non-Patent Documents 1 to 3).

PATENT DOCUMENT

Patent Document 1: WO 2006/049213

NON-PATENT DOCUMENT

Non-Patent Document 1: SYLVAIN M. CHOSSON and ROGER D. HERSCH, "Beating Shapes Relying on Moire Level Lines", ACM Transactions on Graphics, Vol. 34, No. 1, Article 9, Publication date: December 2014.

Non-Patent Document 2: Thomas Walger and Roger David Hersch, "Hiding Information in Multiple Level-line Moires", DocEng '15 Proceedings of the 2015 ACM Symposium on Document Engineering, Pages 21-24

Non-Patent Document 3: Roger David Hersch, Sylvain Chosson, "Band Moire Images", SIGGRAPH '04 ACM SIGGRAPH 2004 Papers, Pages 239-247

SUMMARY

The display method described in Patent Document 1 requires a display apparatus for displaying the pixel rows for right-side display side by side in the right-left direction and the parallax barrier in which the light-shielding member for blocking light is vertically arranged.

Further, in each of Non-Patent Documents 1 to 3, different shapes are displayed by changing the angle at which the two sheets are overlapped. Therefore, in order to display different shapes, a time difference for changing the angle at which the sheets overlap occurs. Non-Patent Documents 1 to 3 do not display different contents in a plurality of directions at the same time.

As described above, there is no disclosure of a technology for easily displaying different contents in a plurality of directions at the same time.

Therefore, an object of the invention is to provide a technology for easily displaying different contents in a plurality of directions at the same time.

To solve the above-mentioned problem, a first characteristic of the invention relates to a display medium for displaying different contents by light emitted in a first direction and light emitted in a second direction, respectively. The display medium according to the first characteristic of the invention includes a plurality of layers formed of a sheet member transmitting light and provided with a point group formed by one or more points, at least a part of the layers overlapping, and each of the light emitted in the first direction and the light emitted in the second direction displays a plurality of contents corresponding to each of the first direction and the second direction based on each portion passing through each of the plurality of layers.

Points may be discretely provided on each of the plurality of layers to form the point group.

A plurality of contents corresponding to each of the first direction and the second direction may be displayed by a difference between a position and a transmittance at which the light emitted in the first direction attenuates by a point group and a position and a transmittance at which the light emitted in the second direction attenuates by a point group.

The point group may be ink jetted by a printer.

A second characteristic of the invention relates to a processing device for determining a position where a point group of the display medium is provided. The processing device according to the second characteristic includes a point group determination unit that determines a position where a point group is provided in each of the plurality of layers so that a difference between a first input image, which is a target image displayed in a first direction, and a first output image displayed in the first direction becomes small, and a difference between a second input image, which is a target image displayed in a second direction, and a second output image displayed in the second direction becomes small.

The point group determination unit may further determine a position where the point group is provided from light and shade in an output image caused by attenuation of light by the point group and attenuation of light by the sheet member through which the light in the first direction and the light in the second direction pass.

The point group may be ink jetted by a printer, and the point group determination unit may divide each of the plurality of layers into virtual cells, determine a density in a cell that divides each of the plurality of layers, and determine an ink jet position in the cell to obtain the determined density in the cell.

A color gamut determination unit that changes a color gamut of a first input image so that a difference between a predetermined density in the first input image and a density expressed by the display medium becomes small, and changes a color gamut of a second input image so that a difference between a predetermined density in the second input image and a density expressed by the display medium becomes small may be further included, and a position of a new point group may be determined by the point group determination unit for the first input image and the second input image changed by the color gamut determination unit.

A third characteristic of the invention relates to a processing program for determining a position where a point group of the display medium is provided. The processing program according to the third characteristic causes a computer to function as a point group determination unit that determines a position where a point group is provided in each of the plurality of layers so that a difference between a first input image displayed in a first direction and a first output image displayed in the first direction becomes small, and a difference between a second input image displayed in a second direction and a second output image displayed in the second direction becomes small.

According to the invention, it is possible to provide a technology for easily displaying different contents in a plurality of directions at the same time.

BRIEF DESCRIPTION OF THE DRAWINGS

FIG. 2(*b*) is a diagram for description of a direction of light for displaying content on the display medium.

FIG. 3(*b*) is a diagram illustrating an example of a point group provided in each layer.

FIG. 3(*c*) is a diagram illustrating an example of a point group provided in each layer.

FIG. 4(*b*) is a diagram for description of an example of an image confirmed from each viewpoint.

FIG. 7(*b*) is an example of an input image referred to in description of a color gamut determination unit.

FIG. 8(*b*) is an example of a simulation image referred to in description of the color gamut determination unit.

FIG. 10(*b*) is an example of an input image to be displayed on the display medium according to an embodiment of the invention.

FIG. 10(*c*) is an example of an input image to be displayed on the display medium according to an embodiment of the invention.

FIG. 11(*b*) is an example of an input image changed by the processing device according to an embodiment of the invention.

FIG. 11(*c*) is an example of an input image changed by the processing device according to an embodiment of the invention.

FIG. 12(*b*) is an example of a point group of each layer calculated by the processing device according to an embodiment of the invention.

FIG. 13(*b*) is an example of an output image displayed by a point group of each layer calculated by the processing device according to an embodiment of the invention.

FIG. 13(*c*) is an example of an output image displayed by a point group of each layer calculated by the processing device according to an embodiment of the invention.

DETAILED DESCRIPTION

Figure 1:
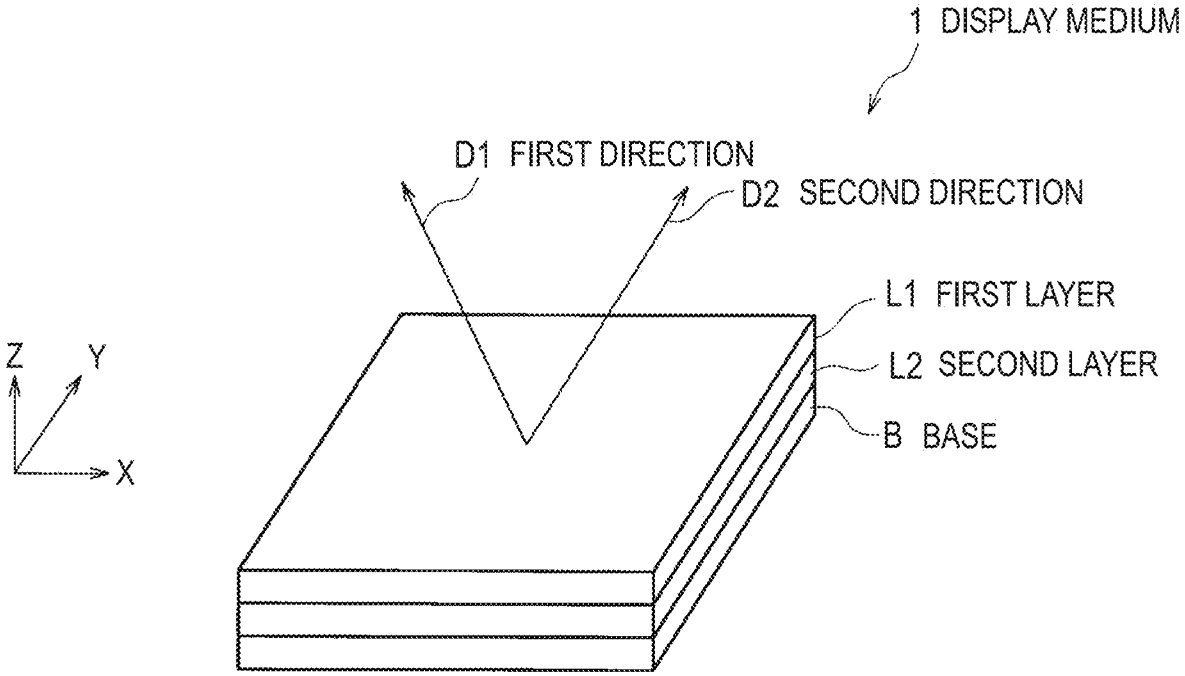
FIG. 1 is a diagram for description of a display medium according to an embodiment of the invention.

Next, embodiments of the invention will be described with reference to the drawings. In the description of the drawings below, the same or similar parts are designated by the same or similar reference symbols.

In the embodiments of the invention, a plane of a sheet member forming a display medium 1 is referred to as an XY-plane formed in an X-direction and a Y-direction. A direction of a thickness of a sheet, which is a direction in which sheets are overlapped, is referred to as a Z-direction.

(Display Medium)

The display medium 1 according to an embodiment of the invention will be described with reference to FIG. 1. The display medium 1 simultaneously displays different contents by light emitted in a first direction and light emitted in a second direction. In the embodiment of the invention, the display medium 1 assumes a case where a light source exists in all directions. Even when the display medium 1 has a specific light source, it is sufficient that light emitted from the display medium 1 can be visually recognized, and the display medium 1 does not have to have a specific light source. The first direction and the second direction in which the display medium 1 displays the contents may be collectively referred to as a designated direction.

The display medium 1 includes a plurality of layers. Each layer has a thickness and is formed by a sheet member that transmits light. A point group formed by one or more points is provided on the plane of the sheet member forming each layer. The point group is a set of one or more points. A pattern of one or more points provided in each layer is referred to as a point group. The point blocks a part of light and partially transmits the light.

Each layer is formed so that at least a part thereof overlaps. A point group is provided in each portion where each layer overlaps. The case where the display medium 1 illustrated in FIG. 1 has a first layer L1 and a second layer L2 will be described. However, the invention is not limited thereto. In the display medium 1, two or more, that is, a plurality of sheet members may be overlapped to form two or more layers.

In the display medium 1, points are discretely provided on each of the plurality of layers to form a point group. The points are formed discretely in each layer by being formed partially centrally or by being formed dispersedly. In the embodiment of the invention, it is not assumed that each layer is filled with points.

The point group formed in each layer is, for example, ink jetted by a printer. One point forming the point group may be formed by the printer jetting ink once, or may be formed by jetting ink a predetermined number of times. The printer can print points in parallel in a grid pattern by jetting at a predetermined location once or more times. The point group is formed by printing points at predetermined positions among points that can be printed in a grid pattern.

The display medium 1 displays a plurality of contents corresponding to each of a first direction D1 and a second direction D2 based on each portion at which each of light emitted in the first direction D1 and light emitted in the second direction D2 passes through each of the plurality of layers. The display medium 1 displays content depending on the presence or absence of a point on a line of sight when an observer observes the display medium 1. The display medium 1 is formed so that the presence or absence of a point on the line of sight differs depending on the direction in which the observer observes the display medium 1. Further, the display medium 1 expresses different densities (luminances) depending on the number of overlapping points on the line of sight. Further, the density of the display medium 1 is attenuated by the number of sheets superimposed on the points on the line of sight. Depending on the direction in which light is emitted from the display medium 1, differences occur in the presence or absence of points and the attenuation of density, and different contents are displayed.

Depending on the presence or absence of a point at a position where light emitted from the first direction D1 passes through each layer, light and shade and a position of a point when the observer observes the light emitted from the first direction D1 are determined. Similarly, depending on the presence or absence of a point at a position where light emitted in the second direction D2 passes through each layer, light and shade and a position of a point when the observer observes the light emitted from the second direction D2 are determined. By providing points at predetermined positions in each of a plurality of layers, a position of a point through which the light emitted in the first direction D1 passes and a position of a point through which the light emitted in the second direction D2 passes can be set to be different from each other. Therefore, the display medium 1 can be formed so that a first output image displayed by the light emitted from the first direction D1 and a second output image displayed by the light emitted from the second direction D2 are different from each other.

The display medium 1 may have a plurality of layers formed on a base B. The base B is arbitrarily arranged according to the surrounding conditions in which the display medium 1 is installed in order to improve visibility of the display medium 1. When the observer observes the display medium 1, the base B shields a background beyond the display medium 1 and improves visibility of an image formed by a point group. It is preferable that the base B has a color with which a color of the point group is easy to understand, avoiding a color similar to the color of the point group. For example, when the point is black, the base B is white. A material of the base B is not limited, and may be, for example, paper.

Figure 2:
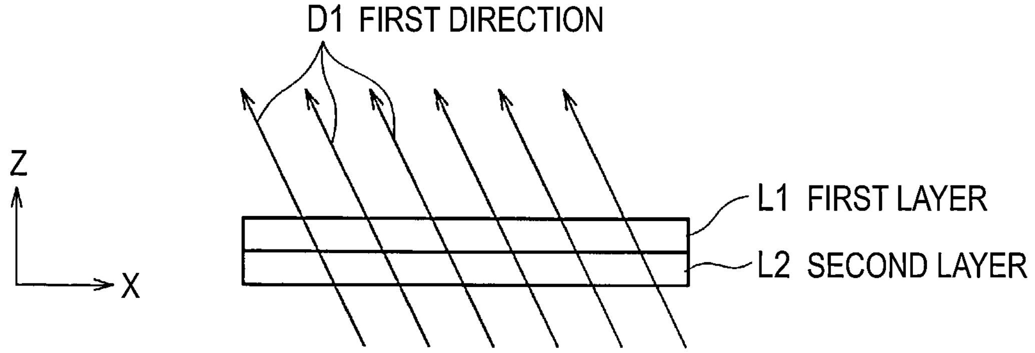
FIG. 2(*a*) is a diagram for description of a direction of light for displaying content on the display medium.
Figure 2:
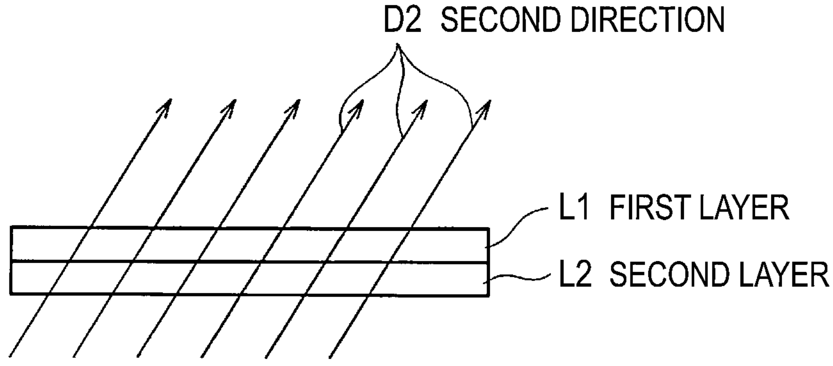

In the embodiment of the invention, a direction in which the display medium 1 displays the content is, as illustrated in FIG. 2, a direction tilted more than the Z-direction and having a predetermined elevation angle (<90°) with respect to the XY-plane. The first direction D1 is tilted in a left direction with respect to the Z-direction, and the second direction D2 is tilted in a right direction.

Note that the direction in which the content illustrated in FIG. 2 is displayed is an example, and is not limited thereto. For example, the content may be displayed not only in the two directions illustrated in FIG. 2 but also in three or more directions. The display medium 1 may display the content in the Z-direction, for example, or may display the content in a direction in which the elevation angle of the first direction D1 or the second direction is changed. The display medium 1 can display the content in any number of directions of two or more directions.

A mechanism of the display medium 1 will be described with reference to FIG. 3 to FIG. 4.

Figure 3:
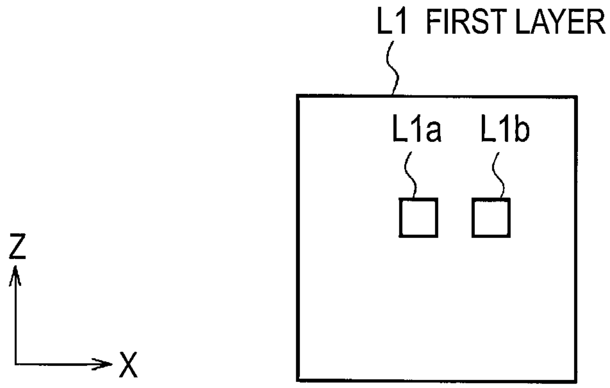
FIG. 3(*a*) is a diagram illustrating an example of a point group provided in each layer.
Figure 3:
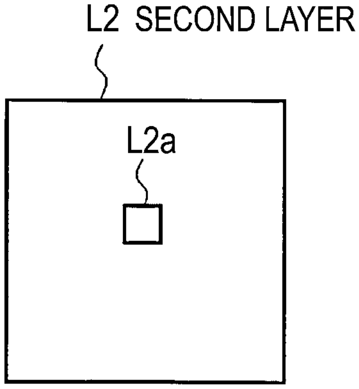
Figure 3:
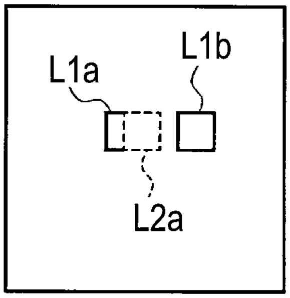

As illustrated in FIGS. 3(*a*) and 3(*b*), each layer is provided with one or more points. The first layer L1 is provided with a point L1*a* and a point Lib separated from each other. The second layer L2 is provided with a point L2*a*. In a state where the first layer L1 and the second layer L2 are overlapped, the point L1*a* and the point L2*a* are formed at partially overlapping positions as illustrated in FIG. 3(*c*).

Figure 4:
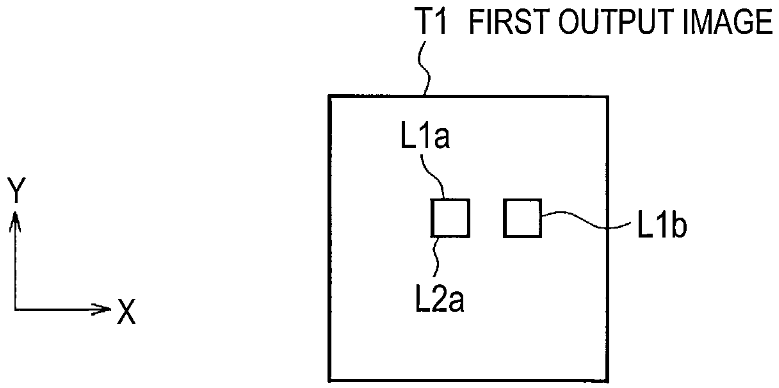
FIG. 4(*a*) is a diagram for description of an example of an image confirmed from each viewpoint.
Figure 4:
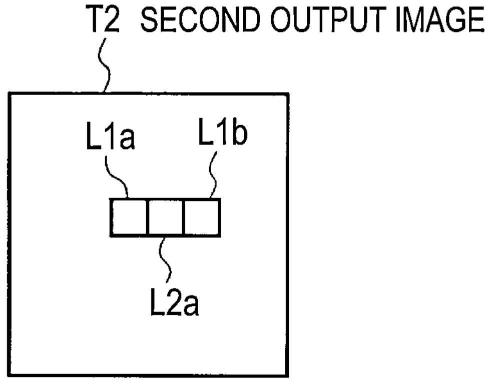

When the first layer L1 and the second layer L2 are overlapped and observed in the first direction D1 illustrated in FIG. 2, a first output image T1 illustrated in FIG. 4(*a*) is observed. In the first output image T1, the point L1*a* of the first layer L1 and the point L2*a* of the second layer L2 appear to overlap. Therefore, two points are observed in the first output image T1. Further, the point on the left side is formed by overlapping the two points L1*a* and L2*a*, and thus is observed to be darker than the point on the right side.

When the first layer L1 and the second layer L2 are overlapped and observed in the second direction D2 illustrated in FIG. 2, a second output image T2 illustrated in FIG. 4(*b*) is observed. In the second output image T2, the point L2*a* of the second layer L2 is observed between the point L1*a* and the point Lib of the first layer. Therefore, in the second output image T2, a rod shape in which three points are connected is observed. When the first layer L1 is formed on the second layer L2, the point L2*a* of the second layer L2 is affected by the attenuation by the sheet of the first layer L1. On the other hand, the points L1*a* and L2*b* of the first layer L1 are provided on an upper surface of an uppermost sheet of the display medium 1, and thus are not affected by attenuation due to the sheet. Therefore, in a rod shape in which a series of single points are connected as illustrated in FIG. 3(*b*), the point L2*a* at a center is observed to be thinner than the point L1*a* and the point Lib on both the right and left sides.

Note that as illustrated in FIG. 1, since the display medium 1 is observed at a predetermined elevation angle, an image observed from each viewpoint is formed in a trapezoidal shape by a perspective method. However, the diagram illustrated in FIG. 4 is obtained by performing trapezoidal correction.

In this way, the display medium 1 displays two contents corresponding to the first direction D1 and the second direction D2, respectively, by a difference between the position and transmittance at which the light emitted in the first direction D1 is attenuated by the point group and the position and transmittance at which the light emitted in the second direction D2 is attenuated by the point group. As illustrated in FIG. 3 and FIG. 4, in the display medium 1, the position and transmittance at which the light emitted in the first direction D1 is attenuated by the point group and the position and transmittance at which the light emitted in the second direction D2 is attenuated by the point group are different from each other.

Here, the transmittance depends on the number of points through which the light passes. As the number of points through which light passes increases, the transmittance decreases. As the number of points through which light passes decreases, the transmittance increases. In addition, the transmittance differs depends on the number of sheets superimposed on the points on the line of sight. As the number of superimposed sheets increases, the transmittance decreases. As the number of superimposed sheets decreases, the transmittance increases.

In this way, in an image that can be confirmed from a viewpoint, a desired image can be displayed when an attenuation rate differs depending on the position. As a result, the display medium 1 can display different images from different viewpoints.

Figure 5:
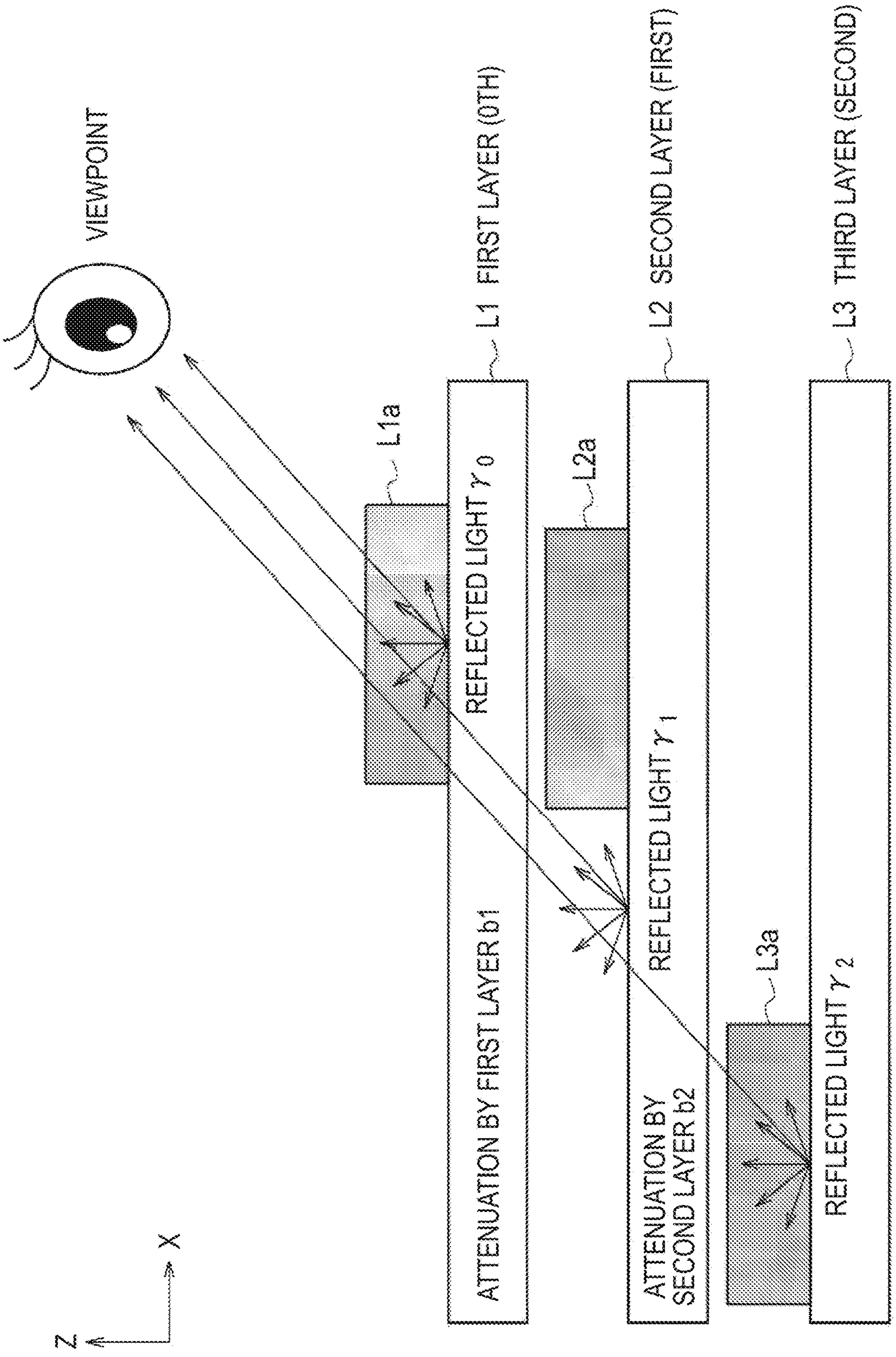
FIG. 5 is a diagram for description of a path of light from reflected light to the viewpoint.

An image formed by light emitted from a predetermined direction will be described with reference to FIG. 5. The display medium 1 illustrated in FIG. 5 is overlapped in the order of a first layer L1, a second layer L2, and a third layer L3 from the top. A point L1_a_ is provided on the first layer L1. A point L2_a_ is provided on the second layer L2. A point L3_a_ is provided on the third layer L3. The point L1_a_ of the first layer L1 and the point L2_a_ of the second layer L2 overlap in the Z-direction. The point L3_a_ of the third layer L3 does not overlap the point L1_a_ of the first layer L1 and the point L2_a_ of the second layer L2 in the Z-direction.

A line of sight illustrated in FIG. 5 passes through the point L1_a_ of the first layer L1 and the point L3_a_ of the third layer L3. The light entering the viewpoint illustrated in FIG. 5 is attenuated by the point L1_a_ of the first layer L1 and the point L3_a_ of the third layer L3.

The light entering the viewpoint is attenuated by other than the point group. For example, the light entering the viewpoint is attenuated by a sheet included in each layer. The light entering the viewpoint illustrated in FIG. 5 is attenuated by sheets included in the first layer L1, the second layer L2, and the third layer L3. In addition, a transparent sheet for printing included in the layer is surface-processed so that ink can be easily applied thereto, and has translucency. Therefore, the light incident on the viewpoint is reflected by the surface of the sheet due to the translucency of the sheet and further attenuated.

In this way, the display medium 1 causes a phenomenon referred to as moire due to the appearance of coarseness and fineness of point groups different from the positions of the point groups of each layer by overlap of the point groups of each layer. In the display medium 1, coarseness and fineness of points differ depending on the viewing direction, and thus different densities are displayed depending on the viewing direction to cause different moire. In this way, the display medium 1 can display different images depending on the viewing direction.

(Solution of Point Group Position)

Here, a description will be given of a method of calculating a position of a point group of each layer for displaying a desired image on the display medium 1 described with reference to FIG. 1.

In the embodiment of the invention, an input image is a target image to be displayed on the display medium 1. An output image is an image displayed by the display medium 1. Input images are prepared in advance according to the number of directions assumed by the display medium 1. For example, in the case of displaying different contents from two directions as illustrated in FIG. 1, two input images are prepared. When the two input images are prepared, the display medium 1 displays two output images.

Note that the point group provided in each layer is defined by the presence or absence of grid-patterned points so that positions of the points can be specified in the image. When the points are formed by jetting ink from the printer, the positions of the points depend on the accuracy of the printer.

The input image is expressed by Equation (1).

[Equation 1]

$$y=[y_0, \ldots, y_m]^T \qquad \text{Equation (1)}$$

y: Input image m: Number of pixels of input image

At this time, a point group of each layer is formed so as to satisfy Equation (2).

[Equation 2]

$$\min\|y-y'\| \qquad \text{Equation (2)}$$

y': Output image displayed in designated direction a

However, y is expressed in range of color gamut of y'

As shown in Equation (2), the display medium 1 needs to optimize the position of the point group of each layer by (1) forming y' close to y and (2) satisfying a condition that a color gamut of y is contained within a color gamut of y'. To solve this optimization problem, a range of an output image y' is set to 0 to 1. The luminance of a region corresponding to one cell is mapped to a value from 0 to 1 by normalization.

Since a point group is formed on each sheet of the display medium 1, a portion where a point is not provided is blank. Therefore, in the embodiment of the invention, when light is incident on such a blank portion, reflection of the sheet occurs, and it is necessary to design a rendering model in consideration of the influence. In the case where ink is applied to one surface, the influence of the reflection of the sheet is small. However, since ink is printed discretely on the display medium 1 and the blank portion is large, it is preferable to consider the influence of the reflection of the sheet.

A rendering model that simulates the output image y' will be described. Here, as illustrated in FIG. 5, the first layer L1 is referred to as a 0th sheet, the second layer L2 is referred to as a first sheet, and the third layer L3 is referred to as a second sheet. Note that although not illustrated in FIG. 5, a base B made of a white reflective material is provided on a bottom surface (nth from 0) of the sheet.

The point group printed on the sheet is shown in Equation (3).

[Equation 3]

$$D=\{d_0, d_1, \ldots, d_{n-1}\} \qquad \text{Equation (3)}$$

D: Point group printed on sheet n: Number of layers $d_i$: Vector indicating presence or absence of point of point group of ith sheet A vector indicating the presence or absence of a point group of an ith sheet is shown in Equation (4). Note that a maximum number z of points provided in each layer is larger than the number m of cells of the input image, and the resolution of each layer is higher than that of the input image. The maximum number z of points provided on each layer corresponds to the number of positions where the printer can jet ink onto each layer.

[Equation 4]

$$d=\{d_0', \ldots, d_z'\} \qquad \text{Equation (4)}$$

z: Maximum number of points provided in one layer (m<z)

d': Transmittance of light when there is a point and 0 when there is no point

In the embodiment of the invention, the transmittance of light by points formed by the ink is defined by q. differs depending on the path length of light, depending on the model of Kubelka-Munk. The path length of light in the ink is expressed by Equation (5).

[Equation 5]

$$l=h/\sin(\alpha) \quad \text{Equation (5)}$$

l: Path length of light in ink h: Height of ink (constant value)

α: Elevation angle in moving direction of light

The transmittance q is a value obtained by multiplying the transmittance of light in a direction perpendicular to the sheet by 1/sin(α).

The transparent sheet for printing is surface-treated so that ink can be easily applied thereto. Therefore, the sheet has translucency. In rendering, this translucency is treated as a reflection of light on a sheet surface. Reflected light on the surface of each sheet is set to r. Note that it is assumed that the light source exists in all directions and the reflected light is isotropically diffused in all directions. Therefore, a position of the light source is not considered.

The amount of reflected light in the designated direction on a surface of an ith sheet is set to $r_i$. Focusing only on the reflected light on the surface of the ith sheet, light passing in the designated direction passes through a point group on the 0th sheet from the ith sheet. The reflected light passes through i−1 sheets. Light is attenuated during passing due to reflection on the printed surface. An image when $r_i$ reaches the viewpoint is expressed by Equation (6).

[Equation 6]

$$y''_i = r_i(p(a, d_0)\circ p(a, d_1)\circ \ldots \circ p(a, d_i)) * (b_0 * b_1 * \ldots * b_i) = r_i \prod_{j=0}^{i} p(a, d_j) b_j \quad \text{Equation (6)}$$

$y''_i$: Image when $r_i$ reaches viewpoint b: Transmittance of sheet

Attenuation by i−1th sheet is $b_i$, $b_0=1$

○: Hadamard product (element product)

p(a,d): Projection operation of point group d in a-direction $r_i$: Amount of reflected light in designated direction on surface of ith sheet Note that the reflected light of the base B provided on the bottom surface (nth from 0) of the sheet is treated in the same manner as the reflected light of the sheet. In addition, $d_n$ is all 1. The reflected light of all the sheets is additively combined, and an image y" of a point group D in a designated direction is defined by Equation (7).

[Equation 7]

$$y'' = \sum_{i=0}^{n} y''_i \quad \text{Equation (7)}$$

An image in the designated direction is obtained by Equation (8).

[Equation 8]

$$y'=fy'' \quad \text{Equation (8)}$$

f: Matrix of quantization operation for obtaining size of target image

When Equation (8) is substituted into Equation (6) and Equation (7) and arranged, the output image y' in the designated direction is represented by Equation (9).

[Equation 9]

$$\begin{aligned} y' &= f\left(r_0 p(a, d_0) b_0 + r_1 (p(a, d_0)\circ p(a, d_1)) b_1 + \cdots + r_n \prod_{j=0}^{n} p(a, d_j) b_j\right) \\ &= f \sum_{i=0}^{n} \left(r_i \prod_{j=0}^{i} p(a, d_j) b_j\right) \end{aligned} \quad \text{Equation (9)}$$

Here, the point group D of each layer is calculated by Equation (10). Note that an input image y, a designated direction a, a sheet transmittance b, an ink transmittance q, the number n of sheets, a projection function p, and a matrix f are given in advance. Further, a is a set of designated directions, and y is a set of input images corresponding to respective designated directions. A predetermined designated direction and an input image corresponding to the designated direction are specified by k.

[Equation 10]

$$D = \underset{D}{\operatorname{argmin}} \sum_{k=0}^{Y-1} \left\| y_k - f \sum_{i=0}^{n} \left(r_i \prod_{j=0}^{i} p(a_k, d_j) b_j\right) \right\| \quad \text{Equation (10)}$$

Y: Number of contents (designated direction) displayed by display medium y: Input image a: Designated direction b: Transmittance of sheet q: Transmittance of ink n: Number of sheets p(•,•): Projection function $r_i$: Amount of reflected light in designated direction on surface of ith sheet f: Matrix of quantization operation for obtaining size of target image (Processing Device)

A processing device 2 according to the embodiment of the invention will be described with reference to FIG. 6. The processing device 2 determines a position where the point group of the display medium 1 is provided. The processing device 2 calculates a position of a point group of each layer for displaying a desired input image, and outputs the position of the point group of each layer to the printer, etc. The printer prints the point group according to the position of the point group of each layer input from the processing device 2. By overlapping respective sheets on which the point group is printed by the printer, the display medium 1 described with reference to FIG. 1, etc. is formed.

The processing device 2 is a general computer including a processing control apparatus 20, a storage apparatus 10, and an input/output interface 30. A function illustrated in FIG. 6 is realized by executing a processing program by a general computer.

The processing control apparatus 20 is a CPU (Central Processing Unit) and executes processing in the processing device 2. The storage apparatus 10 is a ROM (Read Only Memory), a RAM (Random access memory), a hard disk, an SSD, etc., and stores various data such as input data, output data, and intermediate data for the processing control apparatus 20 to execute processing. The input/output interface 30 is an interface for the processing control apparatus 20 to transmit and receive data to and from an external apparatus. Examples of the external apparatus include an input apparatus such as a mouse or a keyboard, a display apparatus, an output apparatus such as a printer, and a computer-readable recording medium.

The processing program may be stored in a computer-readable recording medium such as a hard disk, an SSD (Solid State Drive), a USB (Universal Serial Bus) memory, a CD (Compact Disc), or a DVD (Digital Versatile Disc), or may be distributed via a network.

The storage apparatus 10 stores input image group data 11, parameter data 12, and point group data 13.

The input image group data 11 is set data of an input image corresponding to each designated direction. The input image is a target image to be displayed on the display medium 1.

The parameter data 12 is specific data of a sheet used by the processing device 2 to determine the position of the point group of each sheet. The parameter data 12 is values of parameters required for simulating an output image based on the above Equation (10). Specifically, the parameters are the designated direction a, the sheet transmittance b, the ink transmittance q, the maximum number z of points provided on one layer, the number n of sheets, the projection function p, and the matrix f. The parameter data 12 is stored in the storage apparatus 10 before a process of determining the position of the point group.

The point group data 13 is data for specifying the position of the point group of each sheet calculated by the processing control apparatus 20. The point group data 13 is data input to the printer to print a point at a desired position.

The processing control apparatus 20 includes a point group determination unit 21, a color gamut determination unit 22, and an output unit 23.

The point group determination unit 21 determines the position where the point group is provided in each of a plurality of layers so that a difference between a first input image, which is a target image displayed in the first direction, and a first output image displayed in the first direction becomes small, and a difference between a second input image, which is a target image displayed in the second direction, and a second output image displayed in the second direction becomes small. The point group determination unit 21 simulates the output image in each designated direction and optimizes the point group so as to be closest to the input image. The first input image and the second input image are images desired to be displayed in each direction by the display medium 1. The processing device 2 calculates the position of the point group of the display medium 1 so that the display medium 1 can display the first input image and the second input image. The first output image and the second output image are images displayed in each direction by the display medium 1 formed according to the position of the point group calculated by the processing device 2.

Here, the point group determination unit 21 may determine the position where the point group is provided from light and shade in an output image caused by attenuation of light by the point group. The point group determination unit 21 may further determine the position where the point group is provided in consideration of light and shade caused in an output image by attenuation of light by a sheet member through which light in the first direction and light in the second direction pass. Here, the output image in each designated direction is simulated by Equation (10).

The point group determination unit 21 determines the position where the point group is provided, for example, in a full search. In this instance, the point group determination unit 21 divides each of the plurality of layers into virtual cells, determines the density in the cell that divides each of the plurality of layers, and determines an ink jet position in the cell to obtain the determined density in the cell.

The point group determination unit 21 searches for all possible combinations based on the number z of maximum points provided on one sheet. When all the pixels of the input image are solved at the same time, a search space is excessively large. Thus, the point group determination unit 21 evaluates a point group corresponding to a pixel for each pixel of the input image. For example, when the size of the cell on the sheet corresponding to the input pixel is 3*3, z=3*3*m (m: the number of pixels of the input image). When the number of sheets n=2, a combination of the presence or absence of points corresponding to one pixel of the input image is a combination of 3*3*2=18 patterns, and thus the number searched by the point group determination unit is 2 to the 18th power=262,144 times. The point group determination unit 21 calculates the luminance in each designated direction in all of these combinations, and uses the calculated luminance value to calculate D with which Equation (10) is satisfied.

Note that in the embodiment of the invention, a description has been given of the case where the point group determination unit 21 determines the position where the point group is provided by the full search. However, the invention is not limited thereto. The point group determination unit 21 may determine the position where the point group is provided by using an optimization algorithm such as a genetic algorithm.

The color gamut determination unit 22 changes the color gamut of each input image so that the color gamut having the accuracy of the density searched when calculating the position of the point group includes the color gamut of the input image. Specifically, the color gamut determination unit 22 changes a color gamut of the first input image so that a difference between a predetermined density in the first input image and a density expressed by the display medium 1 becomes small, and changes a color gamut of the second input image so that a difference between a predetermined density in the second input image and the density expressed by the display medium 1 becomes small.

The color gamut that can be expressed by the full search in the point group determination unit 21 depends on the accuracy of the density searched by the full search. Therefore, the color gamut determination unit 22 changes the color gamut of the input image so as to match the color gamut searched by the point group determination unit 21.

For example, an 8-bit image can express a density of 256 gradations. That is, in the input image, the density can be designated from 0 to 255. The density is black in the case of 0 and white in the case of 255. For example, it is assumed that the display medium 1 has two layers, and two input images are present.

Figure 7:
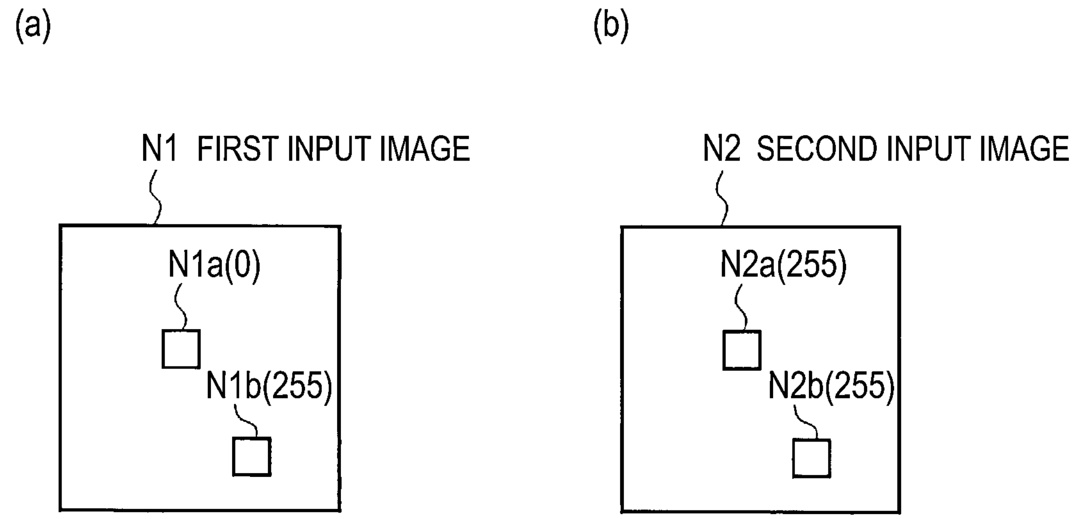
FIG. 7(*a*) is an example of an input image referred to in description of a color gamut determination unit.

As illustrated in FIGS. 7(*a*) and 7(*b*), it is assumed that there is a first input image N1 and a second input image N2. Positions of pixels Nia and Nib of the first input image N1 correspond to positions of pixels N2*a* and N2*b* of the second input image.

Figure 8:
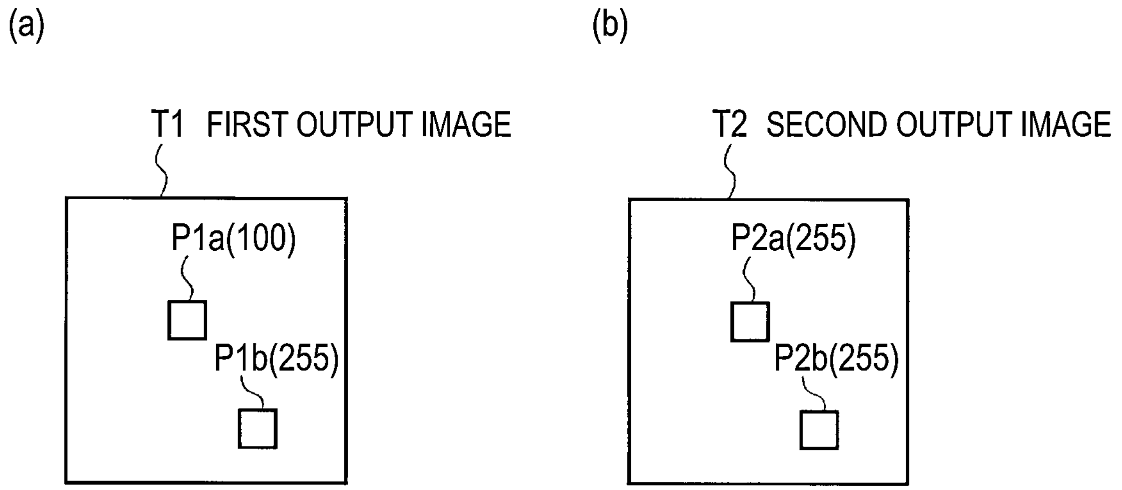
FIG. 8(*a*) is an example of a simulation image referred to in description of the color gamut determination unit.

FIGS. 8(*a*) and 8(*b*) are a first simulation image P1 and a second simulation image P2 simulated based on the point group position determined by the point group determination unit 21. Positions of pixels P1*a* and P1*b* of the first simulation image P1 correspond to positions of pixels P2*a* and P2*b* of the second simulation image P2. Further, positions of pixels N1*a* and N1*b* of the first input image N1 correspond to the positions of the pixels Pia and P1*b* of the first simulation image P1. Positions of pixels N2*a* and N2*b* of the second input image N2 correspond to the positions of the pixels P2*a* and P2*b* of the second simulation image P2. To satisfy the densities set in the first simulation image P1 and the second simulation image P2 for predetermined pixels, the point group determination unit 21 determines the densities of cells on the display medium 1 corresponding to the predetermined pixels.

When each density of N1*a*=0 and N2*a*=255 is specified in an input image, the point group determination unit 21 calculates each density of P1*a*=100 and P2*a*=200 by the simulation of Equation (9), and calculates a density 200 of cells corresponding to N1*a*, N2*a*, P1*a*, and P2*a* on the display medium 1 so as to express this density. Further, each density of N1*b*=255 and N2*b*=255 is designated in the input image, and the point group determination unit 21 calculates each density of P1*b*=255 and P2*b*=255 by simulation of Equation (9), and calculates a density 255 of cells corresponding to N1*b*, N2*b*, P1*b*, and P2*b* on the display medium 1 so as to express this density.

In such a situation, in the second input image N2, the densities of the pixels N2*a* and N2*b* are both set to 255, whereas the densities expressed by the display medium 1 are 200 and 255, so that a difference occurs. This difference causes ghosting. Therefore, the color gamut determination unit 22 reduces the color gamut of each input image and reduces the image contrast so that a difference between a predetermined density in each input image and the density expressed by the display medium 1 becomes small.

With respect to the first input image and the second input image changed by the color gamut determination unit 22, a position of a new point group is determined by the point group determination unit 21. The processing device 2 repeats a process of further determining the point group by the point group determination unit 21 using an input image whose color gamut is changed until a predetermined condition is satisfied. The predetermined condition is the number of times, a time, etc. designated by a user.

When processes of the color gamut determination unit 22 and the point group determination unit 21 are repeated until the predetermined condition is satisfied, the output unit 23 generates and outputs the point group data 13 that specifies the position of the point group of each sheet determined by the point group determination unit 21. The point group data 13 is input to the printer, and a sheet on which points are printed at desired positions is formed.

Figure 9:
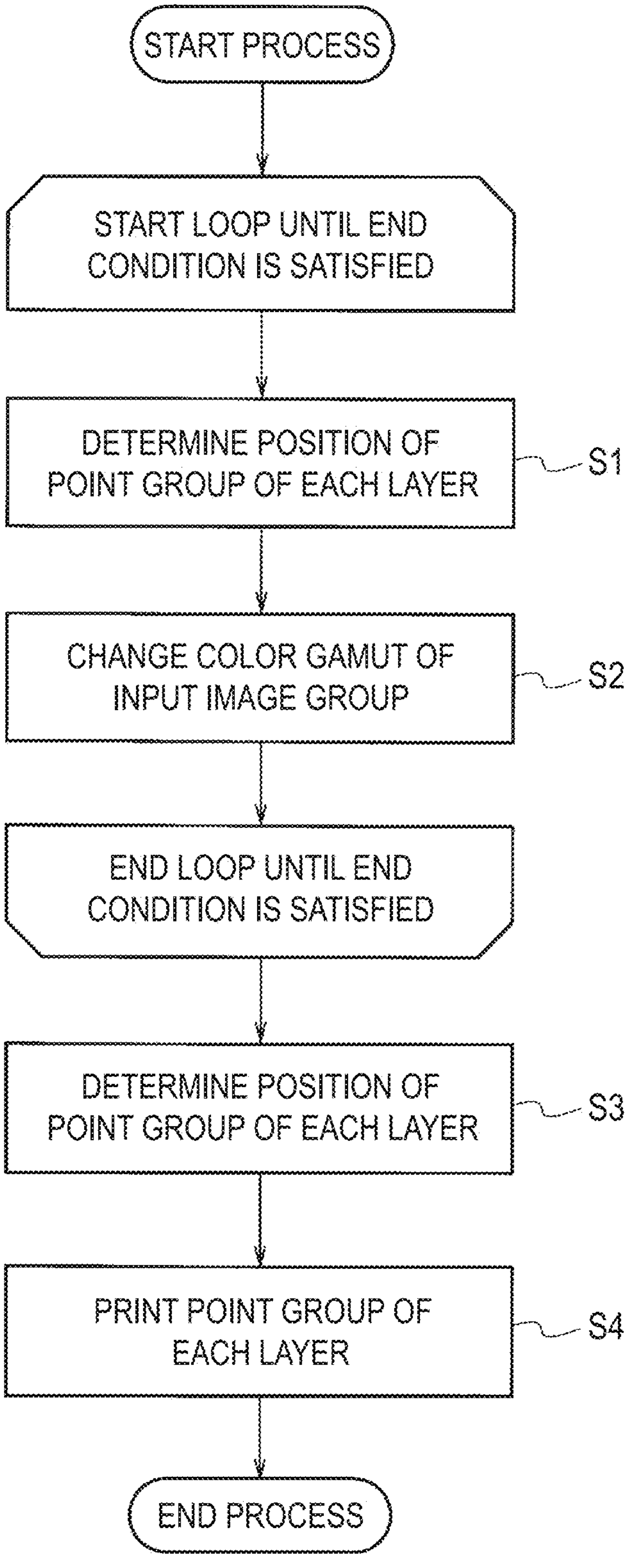
FIG. 9 is a flowchart for description of a processing method according to an embodiment of the invention.

A description will be given of a processing method by the processing device 2 with reference to FIG. 9.

First, processes of steps S1 and S2 are repeated until a predetermined end condition is satisfied. In step S1, the processing device 2 determines the position of the point group of each layer by the point group determination unit 21. In step S2, the processing device 2 changes a color gamut of an input image group by the color gamut determination unit 22 based on the position of the point group determined by the point group determination unit 21 set in step S1. Note that a first process of step S1 is performed according to the input image group data 11 given in advance, and second and subsequent processes are performed according to data of an input image group after being changed by the process of step S2.

When the end condition is satisfied, in step S3, the processing device 2 determines the position of the point group of each layer according to the data of the input image group finally obtained and changed.

In step S4, the processing device 2 inputs the position of the point group of each layer determined in step S3 to the printer by the output unit 23, and causes the printer to print the position of the point group of each layer.

Specific Example

A specific description will be given with reference to FIGS. 10 to 13. Here, the case where the display medium 1 is formed of two layers and displays three contents in three designated directions will be described.

Here, one cell includes 3*3 points. As predetermined directions, elevation angles are set to −45 degrees, 0 degrees, and 45 degrees (normal direction is 0 degrees). Note that each of the predetermined directions is set on a predetermined XZ-plane at an azimuth angle of 0 degrees in each predetermined direction. Further, as parameters, those specified by Equations (14) and (17) described later are used.

Figure 10:
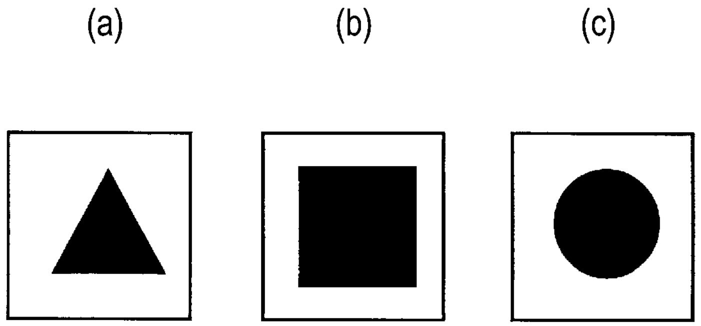
FIG. 10(*a*) is an example of an input image to be displayed on the display medium according to an embodiment of the invention.

FIGS. 10(*a*), 10(*b*), and 10(*c*) are input images, respectively. The input images illustrated in FIG. 10 include white and black, and have a large difference in density, that is, a large difference in luminance.

Figure 11:
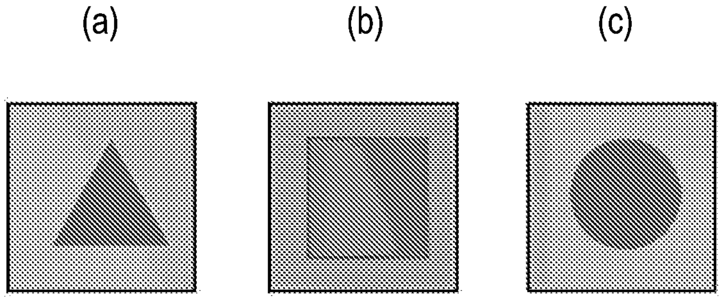
FIG. 11(*a*) is an example of an input image changed by the processing device according to an embodiment of the invention.

Each input image illustrated in FIG. 10 is finally changed to input images illustrated in FIGS. 11(*a*), 11(*b*), and 11(*c*) by the processing device 2. The input image after the change has a smaller difference in density, that is, a difference in luminance than that of the input image before the change, which is a result of narrowing the color gamut by the color gamut determination unit 22.

Figure 12:
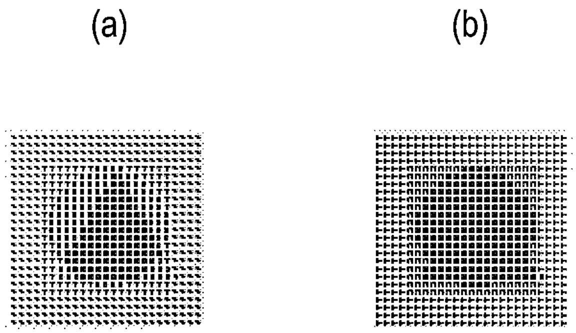
FIG. 12(*a*) is an example of a point group of each layer calculated by the processing device according to an embodiment of the invention.

The processing device 2 calculates the point groups illustrated in FIGS. 12(*a*) and 12(*b*) in order to display the input images illustrated in each diagram of FIG. 11. FIG. 12(*a*) illustrates a point group of the first layer L1, and FIG. 12(*b*) illustrates a point group of the second layer L2.

Figure 13:
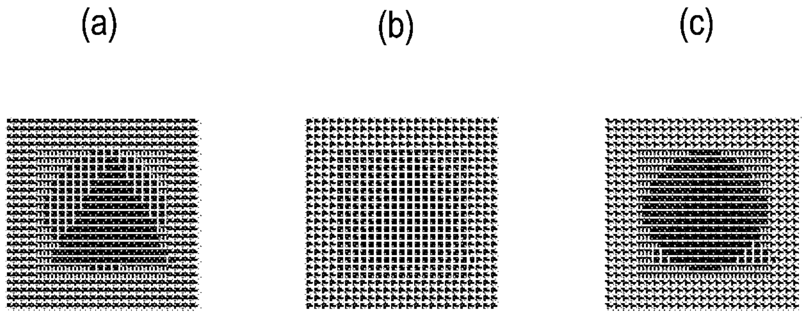
FIG. 13(*a*) is an example of an output image displayed by a point group of each layer calculated by the processing device according to an embodiment of the invention.

The display medium 1 formed by overlapping sheets on which the respective point groups illustrated in FIG. 12 are printed displays respective images illustrated in FIGS. 13(*a*), 13(*b*), and 13(*c*). Each image illustrated in FIG. 13 is a simulation result, which is originally formed into a trapezoid by a perspective method, and is a trapezoid-corrected image. The respective images illustrated in FIGS. 13(*a*), 13(*b*), and 13(*c*) correspond to the respective images illustrated in FIGS. 10(*a*), 10(*b*), and 10(*c*), respectively.

The display medium 1 according to the embodiment of the invention can easily display different contents in a plurality of directions by printing and overlapping a point group on each of a plurality of sheets.

Further, the processing device 2 calculates the position of the point group in consideration of not only the output image displayed by the display medium 1 coming close to the input image but also the attenuation by the sheet and the attenuation of the ink included in the point group. In this way, the display medium 1 can display fine contents.

Further, the processing device 2 changes the color gamut of each input image so that the color gamut having the accuracy of the density obtained when calculating the position of the point group includes the color gamut of the input image. In this way, the display medium 1 can display an output image in which ghosting is unlikely to occur.

(Method of Calculating Parameter of Sheet)

In the embodiment of the invention, a description will be given of a method of calculating a transmittance b of light by the sheet and a transmittance q of light of ink from materials of the sheet and the ink.

As a preparation, the printer settings are designated as CMYK so that all image processing inside the printer does not work. The point group is printed with K (Key-Plate). A sheet on which a predetermined point is printed under this condition is placed on the base B and photographed using a digital camera. The luminance obtained by photographing is treated as a measured value. The light source is in a uniform state in the surroundings as in an environment for observing the display medium 1.

Figure 14:
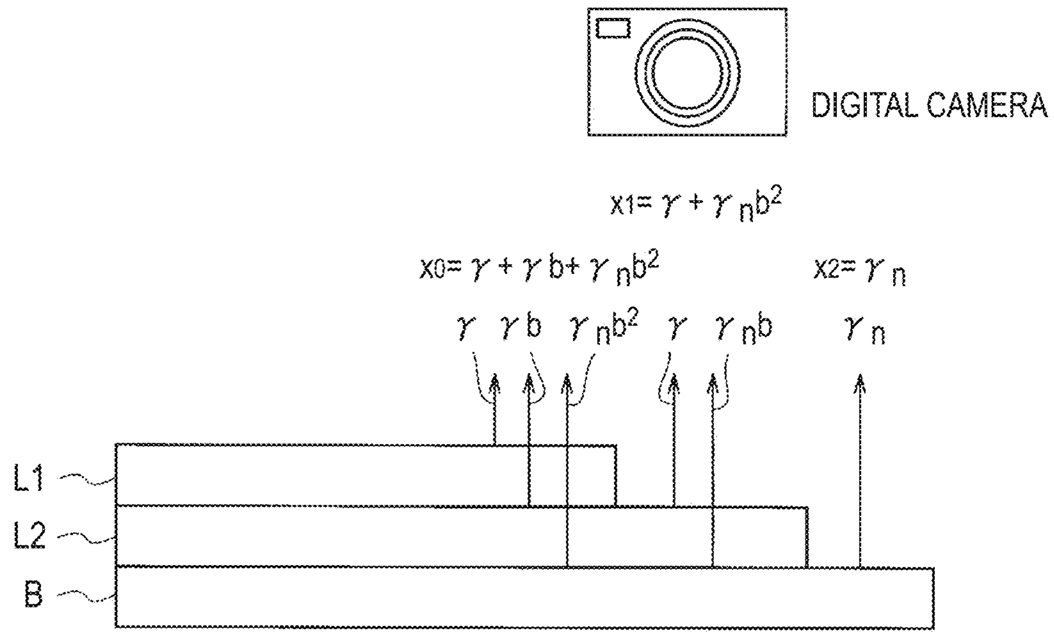
FIG. 14 is a diagram for description of a process of calculating a transmittance of a sheet.

First, the transmittance b of the sheet is estimated. As illustrated in FIG. 14, two transparent sheets are partially shifted and overlapped, and disposed on the base B. Reflected light on each sheet surface is set to be similar, and each transmittance is set to be similar. Then, from a rendering equation of Equation (9), the following Equation (11) with r and b as unknown variables is derived.

[Equation 11]

$$x_0=r+rb+r_nb^2,$$

$$x_1=r+r_nb,$$

$$x_2=r_n. \qquad \text{Equation (11)}$$

$x_0$: Measured value in first layer L1

$x_1$: Measured value in second layer L2

$x_2$: Measured value in base B r: Amount of reflected light on sheet surface b: Transmittance of sheet n: Number of layers When $x_2$ is substituted into $x_0$ and $x_1$, and the equation is rearranged for r, Equation (12) is obtained from Equation (11).

[Equation 12]

$$r=x_0-x_2b^2/(1+b),$$

$$r=-x_1+x_2b \qquad \text{Equation (12)}$$

When r of Equation (12) is substituted, and the equation is rearranged, Equation (13) is obtained.

[Equation 13]

$$0=-2x_2b^2+(x_1-x_2)b+x_0+x_1 \qquad \text{Equation (13)}$$

Equation (13) is a quadratic equation for b, and a solution thereof is obtained by Equation (14). The transmittance b of the sheet is calculated by Equation (14).

[Equation 14]

$$b=\frac{x_1-x_2\pm\sqrt{(x_1-x_2)^2+8x_2(x_0+x_1)}}{4x_2} \qquad \text{Equation (14)}$$

Figure 15:
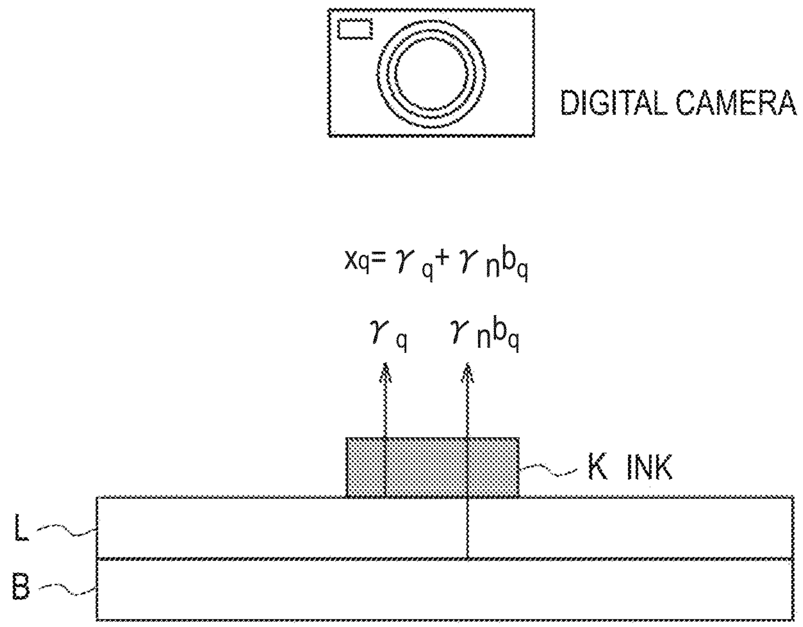
FIG. 15 is a diagram for description of a process of calculating a transmittance of ink.

Next, the transmittance b of the ink is estimated. As illustrated in FIG. 15, a printed sheet is disposed on the base B, and an image is taken under the same condition as that of FIG. 14. In this way, Equation (15) holds.

[Equation 15]

$$x_q=rq+r_nbq \qquad \text{Equation (15)}$$

$x_q$: Measured value on ink

When Equation (15) is rearranged with respect to q, Equation (16) is obtained. The ink transmittance q is calculated by Equation (16).

[Equation 16]

$$q=\frac{x_q}{r+r_nb} \qquad \text{Equation 16}$$

From the above description, the parameters are calculated, for example, as in Equation (17).

[Equation 17]

$$b=0.932, b_n=62.0, r=0.155, q=0.259 \qquad \text{Equation (17)}$$

Other Embodiments

As mentioned above, even though description has been given by the embodiments of the invention, the statements and drawings that form part of this disclosure should not be understood to limit the invention. Various alternative embodiments, examples, and operational technologies are clear to those skilled in the art from this disclosure.

Figure 6:
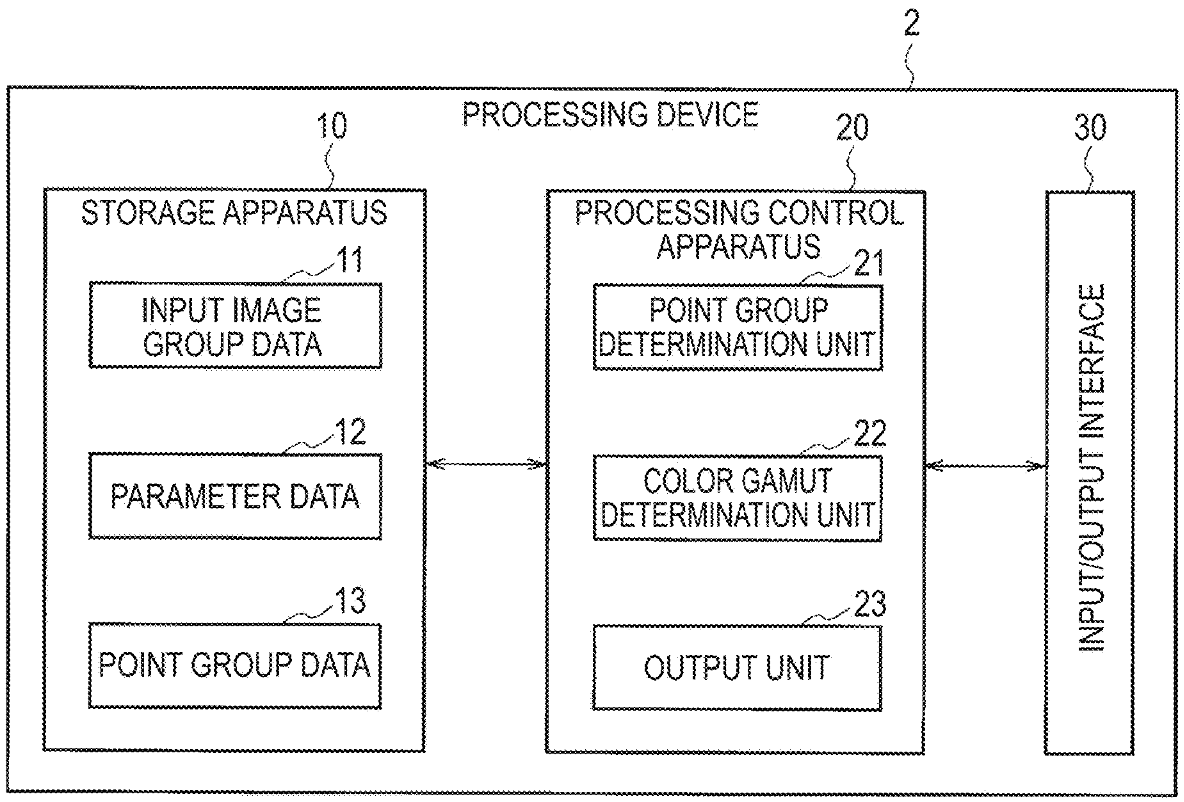
FIG. 6 is a diagram for description of a hardware configuration and a functional block of a processing device according to an embodiment of the invention.

For example, the processing device described in the embodiments of the invention may be configured on one piece of hardware as illustrated in FIG. 6, or may be configured on a plurality of pieces of hardware according to a function and the number of processes. Further, the processing device may be realized on a computer that realizes other functions.

It is natural that the invention includes various embodiments not described here. Therefore, the technical scope of the invention is defined only by the matters specifying the invention according to the reasonable claims from the above description.

REFERENCE SIGNS LIST

1 Display medium
2 Processing device
10 Storage apparatus
11 Input image group data
12 Parameter data
13 Point group data
20 Processing control apparatus
21 Point group determination unit
22 Color gamut determination unit
23 Output unit
30 Input/output interface

The invention claimed is:

1. A display medium for displaying different contents by light emitted in a first direction and light emitted in a second direction, respectively, the display medium comprising a plurality of layers formed of a sheet member transmitting light and provided with a point group formed by one or more points, at least a part of the layers overlapping, wherein each of the light emitted in the first direction and the light emitted in the second direction displays a plurality of contents corresponding to each of the first direction and the second direction based on each portion passing through each of the plurality of layers, and in each of the plurality of layers, a point group is provided so that an error between a first input image, which is a target image displayed in the first direction, and a first output image displayed in the first direction is reduced, and an error between a second input image, which is a target image displayed in the second direction, and a second output image displayed in the second direction is reduced.

2. The display medium according to claim 1, wherein points are discretely provided on each of the plurality of layers to form the point group.

3. The display medium according to claim 1, wherein a plurality of contents corresponding to each of the first direction and the second direction is displayed by the error between a position and a transmittance at which the light emitted in the first direction attenuates by a point group and a position and a transmittance at which the light emitted in the second direction attenuates by a point group.

4. The display medium according to claim 1, wherein the point group is ejected by a printer.

5. A processing device for determining a position where a point group of the display medium according to claim 1 is provided, comprising a point group determination unit that determines positions where a point group is provided in each of the plurality of layers so that the error between a first input image, which is a target image displayed in a first direction, and a first output image displayed in the first direction is reduced, and the error between a second input image, which is a target image displayed in a second direction, and a second output image displayed in the second direction is reduced.

6. The processing device according to claim 5, wherein the point group determination unit further determines a position where the point group is provided from light and shade in an output image caused by attenuation of light by the point group.

7. The processing device according to claim 5, wherein the point group is ejected by a printer, and the point group determination unit divides each of the plurality of layers into virtual cells, determines a density in a cell that divides each of the plurality of layers, and determines positions of ink droplets in the cell to obtain the determined density in the cell.

8. The processing device according to claim 5, further comprising a color gamut determination unit that changes a color gamut of a first input image so that the error between a predetermined density in the first input image and a density expressed by the display medium is reduced, and changes a color gamut of a second input image so that the error between a predetermined density in the second input image and a density expressed by the display medium is reduced, wherein positions of a new point group is determined by the point group determination unit for the first input image and the second input image changed by the color gamut determination unit.

9. A processing program for determining a position where a point group of the display medium according to claim 1 is provided, causing a computer to function as a point group determination unit that determines positions where a point group is provided in each of the plurality of layers so that the error between a first input image displayed in a first direction and a first output image displayed in the first direction is reduced, and the error between a second input image displayed in a second direction and a second output image displayed in the second direction is reduced.

* * * * *